United States Patent [19]

Rittenbach

[11] 4,008,474
[45] Feb. 15, 1977

[54] DOPPLER RADAR FOR DISTINGUISHING BETWEEN APPROACHING AND RECEDING TARGETS AND HAVING INCREASED FREQUENCY RESPONSE

[75] Inventor: Otto E. Rittenbach, Neptune, N.J.

[73] Assignee: The United States of America as represented by the Secretary of the Army, Washington, D.C.

[22] Filed: June 18, 1975

[21] Appl. No.: 588,087

[52] U.S. Cl. .............................................. 343/7.7
[51] Int. Cl.² ........................................... G01S 9/42
[58] Field of Search ................................... 343/7.7

[56] References Cited
UNITED STATES PATENTS

| 3,432,855 | 3/1969 | Kalmus | 343/7.7 |
|---|---|---|---|
| 3,781,773 | 12/1973 | Ravas | 343/7.7 X |
| 3,796,989 | 3/1974 | Ravas et al. | 343/7.7 X |
| 3,845,461 | 10/1974 | Foreman | 343/7.7 X |
| 3,878,526 | 4/1975 | Pederson | 343/7.7 |

Primary Examiner—Malcolm F. Hubler
Attorney, Agent, or Firm—Nathan Edelberg; Jeremiah G. Murray; Arthur Boatright

[57] ABSTRACT

CW is beamed continuously by a radar and is sampled continuously in the radar; the radar continuously senses reflections that are returned to the radar. Only if the distance to a reflecting target is changing significantly per unit time is there an output generated; the output is a positive DC voltage if the distance is closing and a negative DC voltage if the distance is opening. An annunciator arrangement responds to the output DC voltage. Reflection frequency energy is mixed with a sampling of the CW to obtain the difference frequency. At the same time, reflection frequency energy is mixed with +90 degrees phase advanced sampling of the CW to obtain the difference frequency. The phase angle between the two difference frequency outputs is increased by +90 degrees and then are channeled to an analog multiplier. The DC output of the analog multiplier operates an annunciator. A much wider range of doppler frequency (viz. 100:1) is obtained by use of a plurality of processing circuits, connected in parallel and designed for response to overlapping frequency bands, the respective DC outputs of the parallel connected circuits are summed. The overall response is approximately flat over the wide frequency range.

2 Claims, 6 Drawing Figures

DOPPLER RADAR FOR DISTINGUISHING BETWEEN APPROACHING AND RECEDING TARGETS AND HAVING INCREASED FREQUENCY RESPONSE

This invention described herein may be manufactured and used by or for the Government for governmental purposes without payment of any royalties thereon or therefor.

BACKGROUND OF THE INVENTION

In U.S. Pat. No. 3,422,430 issued to the same inventor there is described a doppler radar with target velocity direction indicator but in the patent, low frequency ±45° phase shifters are required; equipment disclosed in the patent is excessively troublesome to build for a relatively wide frequency band, i.e., on the order of 100 to 1. Other doppler radars operate in a frequency band that is too narrow.

SUMMARY OF THE INVENTION

This invention employs a continuously operable CW transmitter and a companion wide band receiver, and an antenna for each, plus circuitry to provide an indication instantaneously as to whether reflected energy is returned by an approaching or a receding target. It operates over a wide range of doppler frequency, viz. 7 octaves, or more than 100 to 1, and with low (about 1.4 db) variation in output voltage as a function of doppler frequency over the operating doppler frequency range.

Figure 1:
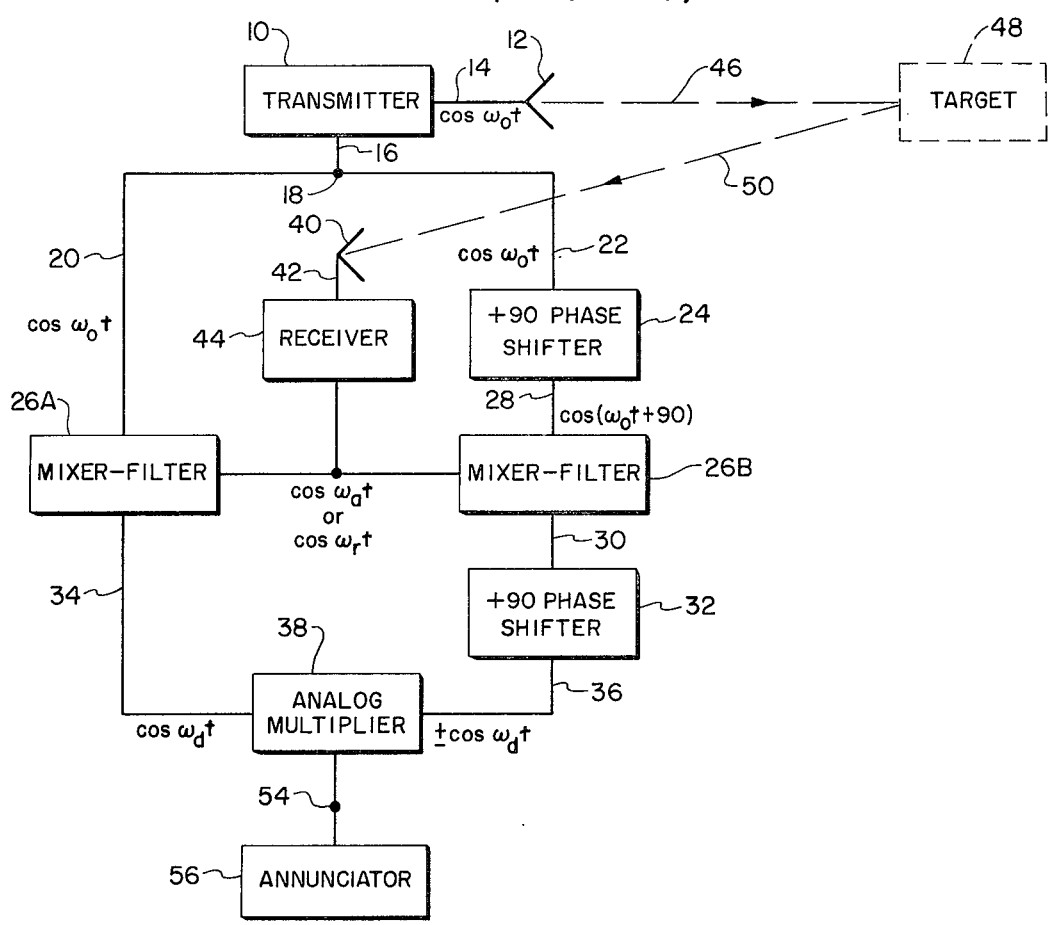
FIG. 1 is a block diagram of a prior art doppler radar operable in a narrow range of doppler frequency, to distinguish an approaching and receding target.

The radar shown in FIG. 1 includes a transmitter 10 that delivers CW in the radar frequency range. A directional antenna 12 is connected by transmission line 14 to the output of the transmitter. The CW generated by the transmitter is sampled and the sampling is channeled by transmission line segment 16 from transmitter 10 to the junction 18 of transmission line segments 20, 22 where the sampling divides between two paths. One path includes a phase shifter 24 that advances the phase of CW in that path by 90°; the input of phase shifter 24 is connected by transmission line segment 22 to the junction 18. Both paths include substantially identical mixer and low pass filter means shown combined in the blocks 26A and 26B; each is referred to hereinafter as a mixer-filter. The input of mixer-filter 26A is connected by transmission line segment 20 to junction 18 and the input of mixer-filter 26B is connected by transmission line segment 28 to the output of phase shifter 24. A transmission line segment 30 connects the output of mixer-filter 26B to the input of a second phase shifter 32 that advances phase 90°. The output of mixer-filter 26A and the output of phase shifter 32 are connected by transmission line segments 34 and 36, respectively, to the two inputs of analog multiplier 38. A commercial analog multiplier used for the purpose is a Hall device (Model HM-4051, Hall-Pak MUltiplier, F.W. Bell Co., Columbus, Ohio); other commercially marketed multipliers may be used.

A directional antenna 40, that tracks with antenna 12 is connected by transmission line segment 42 to the input of continuously open wide band receiver 44. When energy beamed by antenna 12, represented by broken line 46, impinges on and is in part reflected by a target 48 at a distance within the range of the equipment, the energy reflected back to antenna 40, represented broken line 50, is amplified by the receiver and channeled to the second inputs of both mixer-filters 26A and 26B. Each low pass filter blocks all energy from the respective mixer at a frequency equal to or higher than the frequency of the CW, and transmits the difference frequency products of the mixer. The difference frequency output of mixer-filter 26A is channeled to one input of analog multiplier 38. The difference frequency output of mixer-filter 26B is channeled to phase shifter 32 where its phase is advanced +90° and the output of phase shifter 32 is channeled to the other input of analog multiplier 38. The output of analog multiplier 38 at terminal 54 is ±V (DC), corresponding to closing or opening, respectively, of the distance between the target 48 and the antennas 12 and 40. An annunciator 56, visual or aural, connected to terminal 54, responds to the output voltage at terminal 54. Neglecting voltage amplitudes, the circuit operates as follows:

Transmitter output = $\cos \omega_o t$

Reflected energy = $\cos \omega_a t$ or $\cos \omega_r t$ where $a$ refers to an approaching target and $r$ refers to a receding target.

One of the inputs to a mixer-filter 26A is $\cos \omega_o t$; the other input is either $\cos \omega_a t$ or $\cos \omega_r t$. Thus, the input to multiplier 38 from mixer-filter 26A is $\cos \omega_d t$ where $\omega_d$ is either $(\omega_a - \omega_o)$ or is $(\omega_o - \omega_r)$ and where $d$ designates difference.

The input to mixer-filter 26B from phase shifter 24 is $\cos(\omega_o t + 90)$; the other input is either $\cos \omega_a t$ or $\cos \omega_r t$. Thus, the input to phase shifter 32 is either $\cos(\omega_a t - \omega_o t - 90)$ or $\cos(\omega_o t + 90 - \omega_r t)$. Since $(\omega_a - \omega_o)$ and $(\omega_o - \omega_r)$ is equal to $\omega_d$, the input to phase shifter 32 is either $\cos(\omega_d t - 90)$ when the target is approaching or $\cos(\omega_d t + 90)$ when the target is receding. The output of the phase shifter 32 is advanced 90 degrees relative to the output from mixer-filter 26A and thus is $\cos \omega_d t$ when the target is approaching and is $\cos(\omega_d t - 180)$ or $-\cos \omega_d t$ when the target is receding.

Thus, the two inputs to the analog multiplier 38 when there is an approaching or receding target 48 is ± $\cos \omega_d t$ and $\cos \omega_d t$ respectively, and the corresponding outputs of the analog multiplier are voltage levels +V or −V for an approaching or receding target 48, respectively. The annunciator 56 has different responses for +V and −V.

Figure 2:
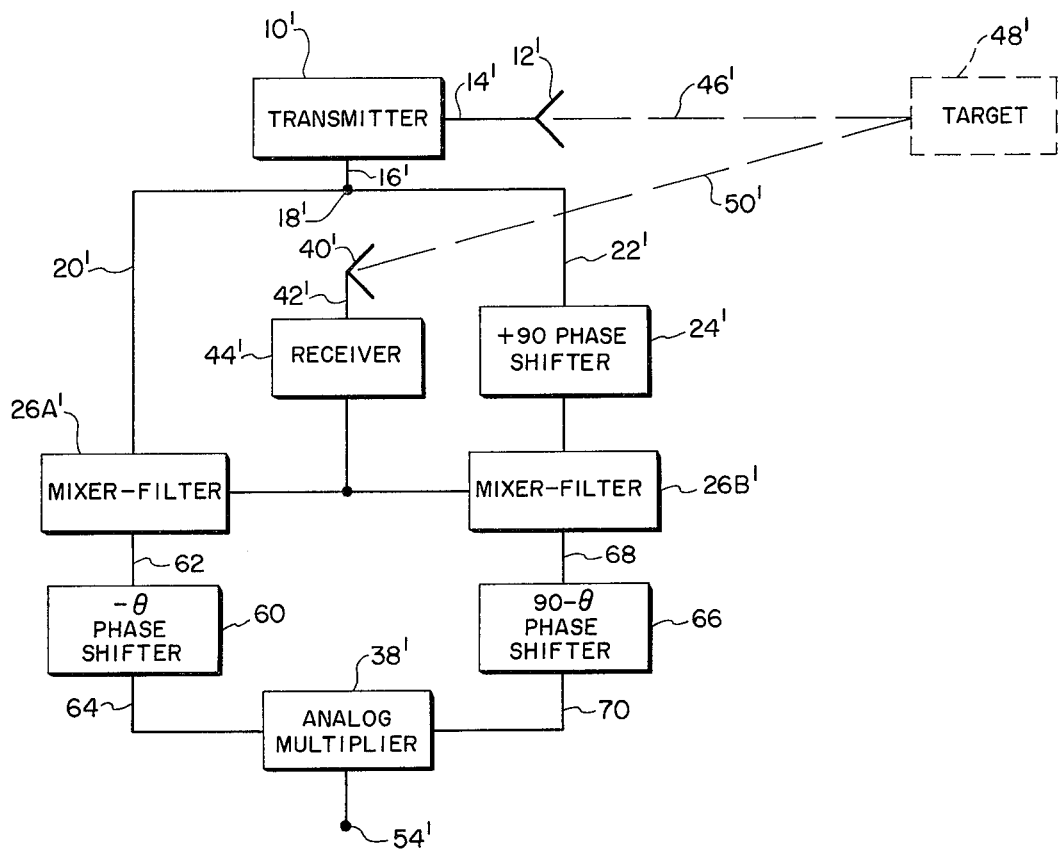
FIG. 2 shows a prior art variation of the doppler radar of FIG. 1.

The circuit shown in FIG. 2 differs from that shown in FIG. 1 in that the outputs of both mixer-filters 26A' and 26B' are shifted in phase but that the output of mixer-filter 26B' is advanced in phase 90 degrees relative to the output of mixer-filter 26A'. In the drawing, the phase of the output of mixer-filter 26A' is delayed $\theta$ degrees and the phase of the output of mixer-filter 26B' is advanced $(90 - \theta)$ degrees. Circuit components in FIG. 2 that are identical to those in FIG. 1 have the same reference characters except that in FIG. 2 they are primed. A phase shifter 60 for retarding phase by $\theta$ degrees is connected by transmission line segment 62 to the output of mixer-filter 26A'. Since the output of mixer-filter 26A' is $\cos \omega_d t$, the output of phase shifter 60, which is connected by transmission line segment 64 to an input of analog multiplier 38', is $\cos (\omega_d t - \theta)$. Similarly, a phase shifter 66 for advancing phase $(90 - \theta)$ degrees is connected by transmission line segment 68 to the output of mixer-filter 26B'. Since the output of mixer-filter 26B' is $\cos (\omega_d t - 90)$ for an approaching target and is $\cos (\omega_d t + 90)$ for a receding target, the output of phase shifter 66 which is connected to the other input of analog multiplier 38' by transmission line segment 70, is $\cos (\omega_d t - \theta)$ for an approaching target and is $\cos (\omega_d t - \theta + 180)$ or $-\cos (\omega_d t - \theta)$, for a receding target. Therefore, the output of analog multiplier 38' is the same as that for an analog multiplier 38, namely +V (DC) for an approaching target and −V (DC) for a receding target.

Figure 3:
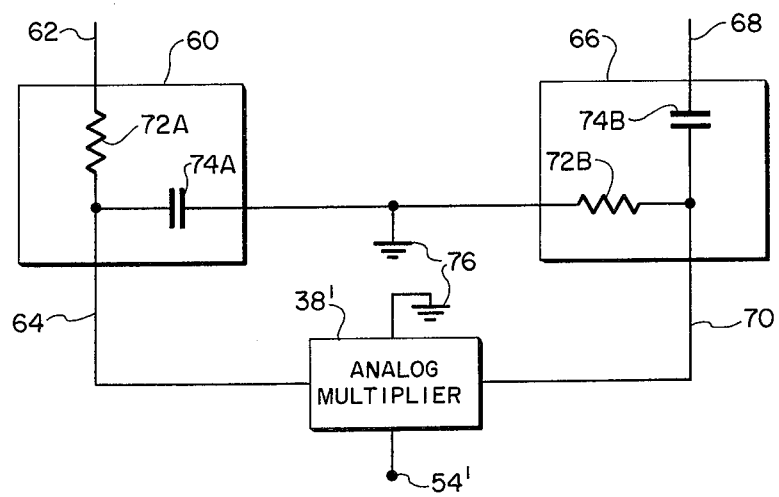
FIG. 3 shows the phase shifters of the radar shown in FIG. 2.

The advantage of the circuit shown in FIG. 2 over that shown in FIG. 1 is that in FIG. 2 a complex 90 degree phase shifter is not required. FIG. 3 shows that phase shifters 60 and 66 include identical resistors 72A and 72B and identical capacitors 74A and 74B. In phase shifter 60, the resistor 72A is in series with transmission line segments 62 and 64 and in phase shifter 66 the capacitor 74B is connected in series with transmission line segments 68 and 70. The input to multiplier 38' from phase shifter 60 is taken across capacitor 74A which is connected between the junction of resistor 72A and transmission line segment 64 and a reference potential 76, shown as ground. The input to multiplier 38' from phase shifter 66 is taken across resistor 72B which is connected between the junction of capacitor 74B and transmission line segment 70 and the reference potential 76. Since the inputs to both phase shifters are at the same frequency (viz. $f_d$) the two phase shifters increase by 90 degrees the phase angle between the output of mixer-filter 26B' and the output of the mixer-filter 26A'. The analog multiplier in FIG. 2 operates as in FIG. 1.

The disadvantage of the phase shift arrangement in FIG. 3 is that since the relationship of the amplitudes of voltages across resistor 72B and capacitor 74A vary substantially with frequency over a relatively narrow frequency range, voltage output of the analog multiplier varies substantially from a level below the noise level which is, in effect, zero output to a peak level which may be high enough to saturate the adder circuitry connected to the output of the analog multiplier.

Figure 4:
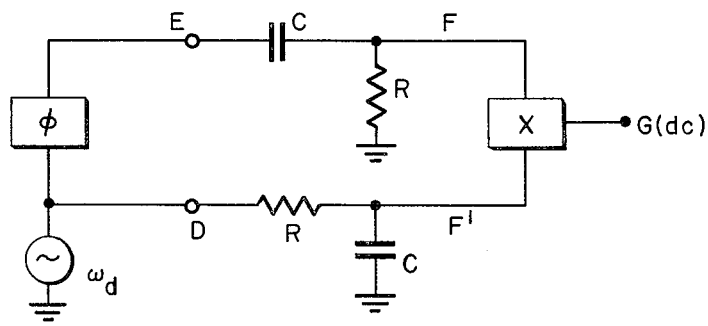
FIG. 4 is an equivalent circuit diagram of FIG. 2 where the two inputs to the phase shifters are energies at the doppler frequency but separated in phase.

In FIG. 4, an equivalent source of doppler frequency $f_d$ and an equivalent phase shifter $\phi$ simulates the conditions in FIGS. 1 and 2 of approaching and receding targets.

(1) the waveform at F is $\sqrt{2} \, (\cos \phi + j \sin \phi) \left( \dfrac{j \, (\omega/\omega_o)}{1 + j \, (\omega/\omega_o)} \right)$ which converts to $\sqrt{\dfrac{2}{1 + (\omega/\omega_o)^2}} \, \bigg/ \tan^{-1} \dfrac{\cos \phi + (\omega/\omega_o) \sin \phi}{(\omega/\omega_o) \cos \phi - \sin \phi}$ (2) the waveform at F' is $\dfrac{\sqrt{2}}{1 + j \, (\omega/\omega_o)}$ which converts to $\sqrt{\dfrac{2}{1 + (\omega/\omega_o)^2}} \, \bigg/ - \tan^{-1} (\omega/\omega_o)$ (3) the magnitude of G (dc) is as follows:

$$\dfrac{1}{(\omega/\omega_o) + (\omega_o/\omega)} \cos \left( \tan^{-1} (\omega/\omega_o) + \tan^{-1} \left( \dfrac{\cos \phi + (\omega/\omega_o) \sin \phi}{(\omega/\omega_o) \cos \phi - \sin \phi} \right) \right)$$

For approaching targets ($\phi = -90$ degrees) the voltage at G (dc) is $\dfrac{1}{(\omega/\omega_o) + (\omega_o/\omega)}$ For receding targets ($\phi = 90$ degrees) the voltage at G (dc) is $\dfrac{-1}{(\omega/\omega_o) + (\omega_o/\omega)}$ If $\phi = 0$, the voltage at G (dc) is zero.

Figure 5:
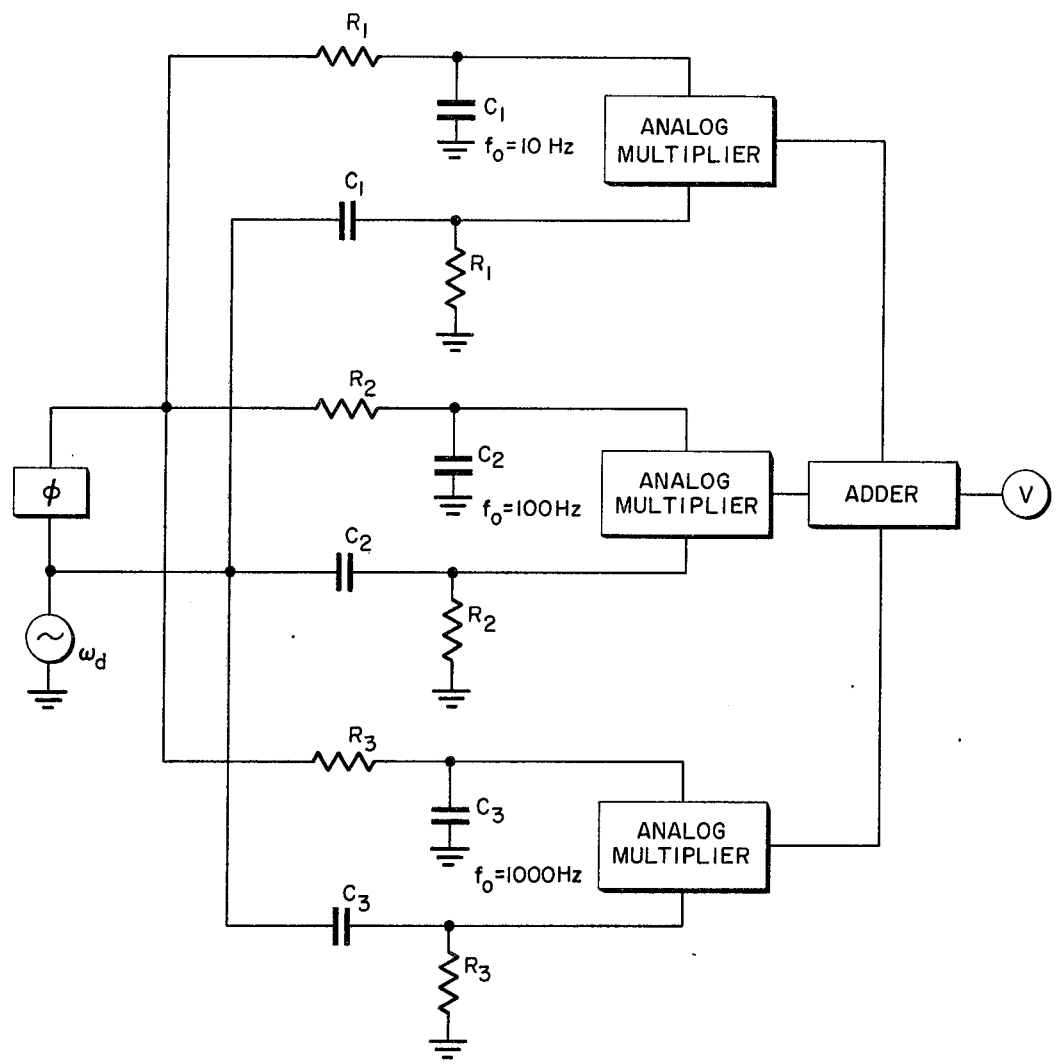
FIG. 5 is a preferred embodiment of this invention including three parallel-connected circuits as shown in FIG. 4 for operation in overlapping frequency bands and including one adder for their respective DC outputs.
Figure 6:
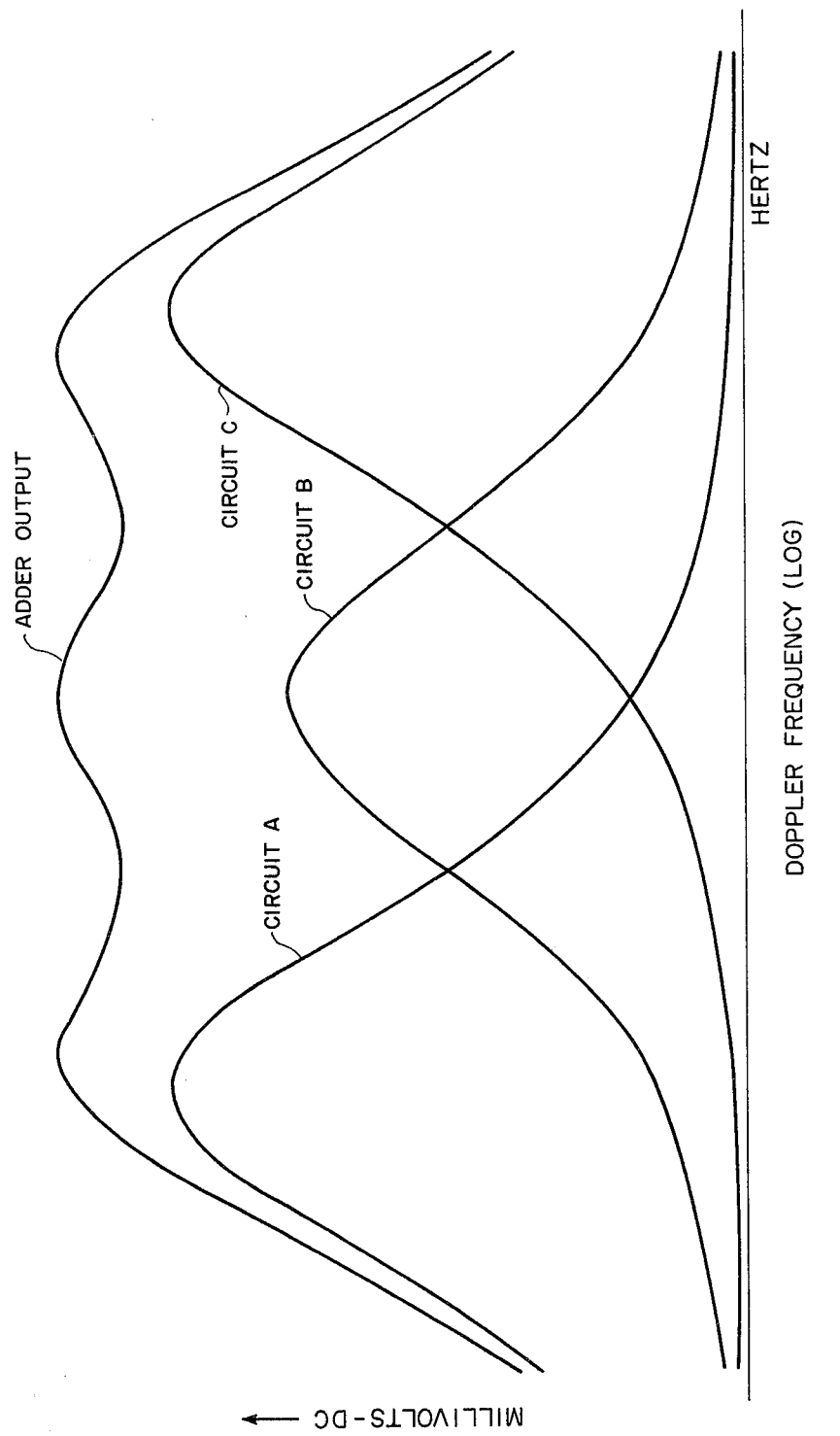
FIG. 6 shows three frequency response curves representing positive polarity DC voltage output as a function of frequency, plotted along a logarithmic base, of three parallel-connected circuits as in FIG. 5 and a summation curve which represents the positive polarity output of the adder in FIG. 5. Corresponding mirror image negative polarity DC curves are not included in FIG. 6.

Thus, voltage amplitude changes with frequency. The voltage amplitude may range high enough to saturate or it may range low enough to be below the noise level. To reduce the amplitude range, two or more circuits as in FIG. 4 designed for operation in overlapping frequency ranges may be used and their outputs added. FIG. 5 shows an equivalent signal generator for doppler frequency $f_d$ and an equivalent phase shifter $\phi$ that simulates an approaching or receding target and provides the 90 degree phase difference, as in FIG. 4. FIG. 5 includes three phase shifters and multiplier circuits in place of the one shown in FIG. 4 but for different frequency bands as illustrated by the positive polarity curves in FIG. 6. The corresponding negative polarity curves are omitted in FIG. 6. The outputs of the three analog multipliers are summed in an adder and indicated by a dc voltmeter connected to the output of the adder. The center peak response frequencies of the three parallel circuits are essentially an equal number of octaves apart and are chosen arbitrarily, but within the limits for satisfying operational requirements; the curves shown in FIG. 6 were for 10, 100, and 1000 Hz and the peak output of the 100 Hz circuit was adjusted to a predetermined fraction of the equal peak outputs of the 10 Hz and 1000 Hz circuits so that the sum of the outputs of the three parallel circuits approximates flat response over the combined frequency bands of the three circuits. The intermediate peak circuit was made to have an output peak amplitude equal to about 0.80 of the equal output peak amplitudes of the other two circuits. For less ripple in the output voltage of the adder as a function of frequency, four or more circuits are used.

What is claimed is:

1. A Doppler radar for indicating approaching and receding targets comprising:
   a first mixer-filter means;
   a first phase shifter means;
   transmitter means for transmitting a CW beam of energy of a predetermined frequency toward a moving target and for transmitting energy at said predetermined frequency to said first mixer-filter means and said first phase shifter means;
   receiver means for receiving reflections of said transmitted CW beam of energy;
   said first mixer-filter means connected to the output of said receiver means for producing the difference frequency between said transmitted and said reflected CW beams of energy;
   a second mixer-filter means connected to the outputs of said receiver means and said first phase shifter means for producing the difference frequency between said reflected CW beam of energy and the output of said first phase shifter means;
   a plurality of parallel connected circuit means;
   each said circuit means including a frequency responsive phase shifter means connected to the output of said first and second mixer-filter means for providing a relative phase shift of 90 degrees between the output signals of said first and said second mixer-filter means;
   each said frequency responsive phase shifter means tuned to different overlapping frequency bands;
   each said parallel connected circuit means including a multiplier means connected to the outputs of the respective one of said frequency responsive phase shifter means for producing a DC output voltage; and
   means connected to the output of each said multiplier means for summing said DC output voltages.

2. A Doppler radar as defined in claim 1 wherein each said frequency responsive phase shifter means includes first and second RC phase shifters;
   each said first RC phase shifter being connected to the ouput of said first mixer-filter means;
   each said second RC phase shifter being connected to the output of said second mixer-filter means;
   said first and second RC phase shifters of each said frequency responsive phase shifter means providing a relative phase shift which differs by 90 degrees with respect to each other.

* * * * *